US010491864B1

United States Patent
Florentino et al.

(10) Patent No.: US 10,491,864 B1
(45) Date of Patent: *Nov. 26, 2019

(54) IN-CONTENT SECURITY CAMERA DATA STREAMING

(71) Applicant: Amazon Technologies, Inc., Seattle, WA (US)

(72) Inventors: Mark Lester Florentino, Irvine, CA (US); Francis Xavier Surjo-Subagio, Irvine, CA (US)

(73) Assignee: Amazon Technologies, Inc., Seattle, WA (US)

(*) Notice: Subject to any disclaimer, the term of this patent is extended or adjusted under 35 U.S.C. 154(b) by 317 days.

This patent is subject to a terminal disclaimer.

(21) Appl. No.: 14/958,891

(22) Filed: Dec. 3, 2015

(51) Int. Cl.
H04N 19/13 (2014.01)
H04N 19/70 (2014.01)
H04N 19/174 (2014.01)
H04N 7/18 (2006.01)
H04N 5/265 (2006.01)
G06T 19/00 (2011.01)
H04N 5/76 (2006.01)
A63F 13/355 (2014.01)
A63F 13/30 (2014.01)

(52) U.S. Cl.
CPC ............ H04N 7/181 (2013.01); A63F 13/30 (2014.09); A63F 13/355 (2014.09); G06T 19/006 (2013.01); H04N 5/265 (2013.01); H04N 5/76 (2013.01)

(58) Field of Classification Search
CPC ....... H04N 5/265; H04N 7/181; G06T 19/006
See application file for complete search history.

(56) References Cited

U.S. PATENT DOCUMENTS

| 2003/0197785 A1 | 10/2003 | White et al. |
| 2008/0026845 A1 | 1/2008 | Aguilar et al. |
| 2008/0207329 A1 | 8/2008 | Wallace et al. |
| 2009/0009605 A1 | 1/2009 | Ortiz |
| 2009/0118001 A1 | 5/2009 | Kelly et al. |
| 2009/0275414 A1* | 11/2009 | Lee .................... A63F 13/12 463/42 |

(Continued)

OTHER PUBLICATIONS

U.S. Appl. No. 14/958,858, filed Dec. 3, 2015, Florentino et al.

(Continued)

Primary Examiner — Obafemi O Sosanya
(74) Attorney, Agent, or Firm — BakerHostetler

(57) ABSTRACT

Techniques for in-content security camera data streaming are described herein. In some examples, a security camera may be inserted into an executing content item, such as a multi-player video game. The security camera may be associated with a particular participant, such as a player, of the video game or other content item. In some examples, image data, such as video data, associated with the security camera may be rendered by one or more components that are remote from the associated participant, such as one or more remote servers. The remotely rendered security camera image data may then be transmitted to the participant over one or more communications networks, such as by using streaming content delivery techniques. Also, in some examples, audio data associated with the security camera may also be remotely rendered and transmitted in combination with the security camera image data.

20 Claims, 11 Drawing Sheets

(56) References Cited

U.S. PATENT DOCUMENTS

| | | | |
|---|---|---|---|
| 2010/0304869 A1* | 12/2010 | Lee | A63F 13/355 |
| | | | 463/42 |
| 2011/0113382 A1 | 5/2011 | Cannon et al. | |
| 2011/0216060 A1* | 9/2011 | Weising | G09G 5/08 |
| | | | 345/419 |
| 2011/0264494 A1 | 10/2011 | Lechowicz | |
| 2012/0309543 A1* | 12/2012 | Shimada | H04N 5/76 |
| | | | 463/42 |
| 2013/0129304 A1 | 5/2013 | Feinson | |
| 2013/0344960 A1 | 12/2013 | Perry et al. | |
| 2014/0004951 A1 | 1/2014 | Kern et al. | |
| 2014/0038708 A1* | 2/2014 | Davison | A63F 13/12 |
| | | | 463/31 |
| 2014/0073424 A1* | 3/2014 | Klee | A63F 13/30 |
| | | | 463/31 |
| 2014/0176533 A1* | 6/2014 | Dillavou | G06T 19/006 |
| | | | 345/419 |
| 2014/0211019 A1 | 7/2014 | Choi | |

OTHER PUBLICATIONS

U.S. Appl. No. 14/958,880, filed Dec. 3, 2015, Florentino et al.
U.S. Appl. No. 14/958,858; Non-Final Office Action; dated Nov. 24, 2017; 39 pages.
U.S. Appl. No. 14/958,858; Final Office Action; dated Apr. 18, 2018; 22 pages.
U.S. Appl. No. 14/958,880; Non-Final Office Action; dated Feb. 16, 2018; 21 pages.
U.S. Appl. No. 14/958,880; Final Office Action; dated Jun. 14, 2018; 25 pages.
U.S. Appl. No. 14/958,858; Non-Final Office Action; dated Aug. 10, 2018; 18 pages.
U.S. Appl. No. 14/958,880; Non-Final Office Action; dated Dec. 14, 2018; 25 pages.
U.S. Appl. No. 14/958,858; Final Office Action; dated Jan. 25, 2019; 16 pages.
U.S. Appl. No. 14/958,858; Non-Final Office Action; dated Jun. 19, 2019; 16 pages.
U.S. Appl. No. 14/958,880; Notice of Allowance; dated Jun. 13, 2019; 13 pages.

* cited by examiner

IN-CONTENT SECURITY CAMERA DATA STREAMING

BACKGROUND

The popularity of electronically presented content items, such as video games and other media, has increased dramatically in recent years. Some such content items may be accessed by large numbers of participants that may control and otherwise provide input to the content item. For example, massively multiplayer online (MMO) video games and other multi-player video games may often be accessed by large numbers of players. The players may often control characters or other entities that may move throughout a large virtual area associated with the video game. In some examples, a game client may locally render a player view, which may depict a particular portion of the game's entire virtual area, such as a particular portion of the virtual area that surrounds a character controlled by the player. This may often be advantageous because it may allow the player to view portions of the virtual area that surround the player's character, while not requiring the client device to receive, load, and/or process data associated with the entire virtual area. In some cases, however, it may be desirable for a player to view other portions of the virtual area, even when the player's character is not located at or near those other portions. Additionally, it may be desirable for players to continue to view certain portions of the virtual area even when the player has logged out and is not actively participating in the game. For example, if a player's character has created or acquired valuable assets (e.g., structures, goods, weapons, currency, or other valuables), it may sometimes be desirable for a player to be able to view those assets when the player is not logged off and/or the player's character is not located at or near those assets. This may help to ensure that the assets are not damaged or stolen, for example by other characters or events within the game.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
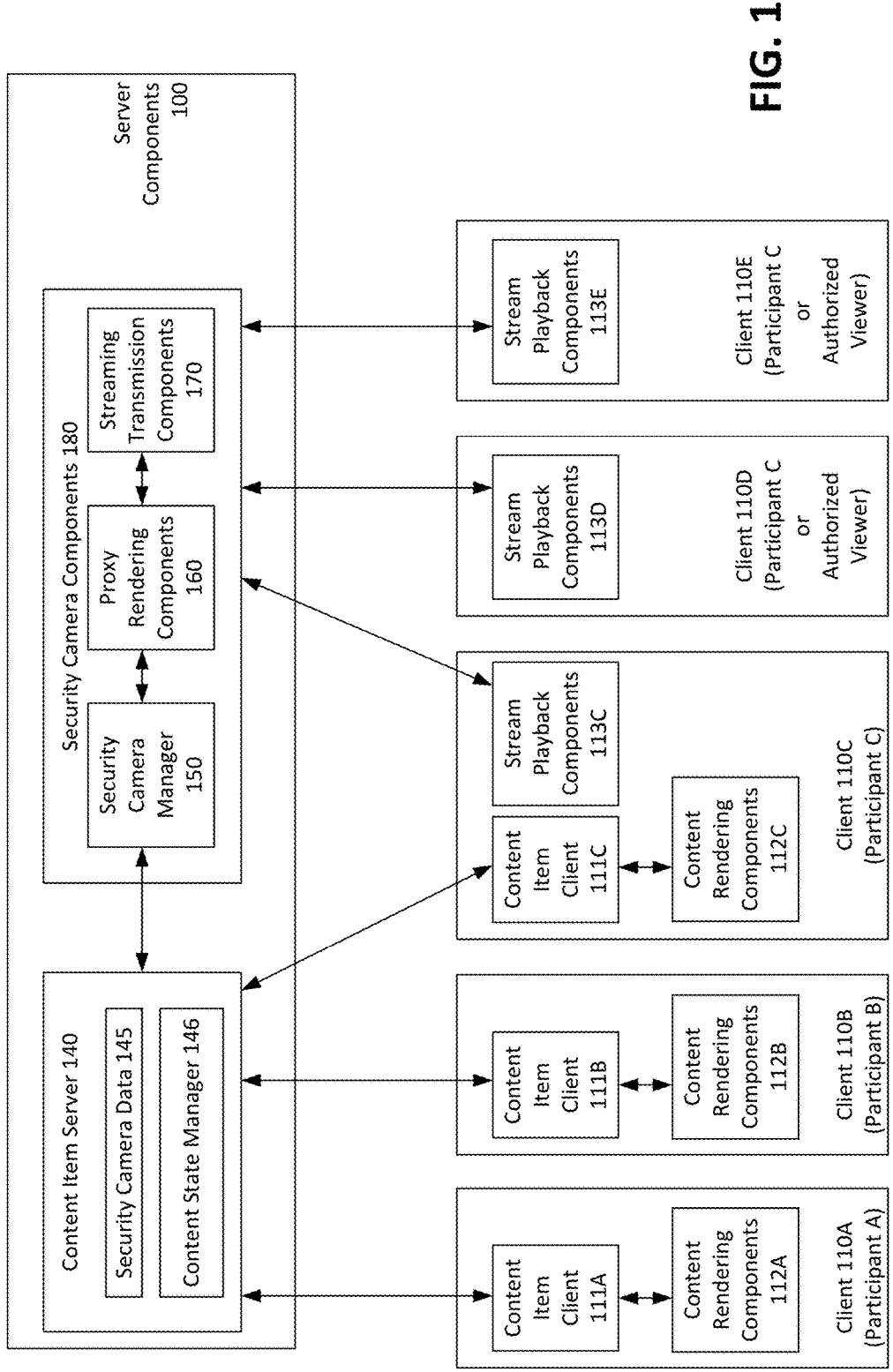
FIG. 1 is a diagram illustrating an example system for in-content security camera data streaming that may be used in accordance with the present disclosure.

Techniques for in-content security camera data streaming are described herein. In some examples, a security camera may be inserted into an executing content item, such as a video game. The security camera may be associated with a particular participant, such as a player, of the video game or other content item. In some examples, image data, such as video data, associated with the security camera may be rendered by one or more components that are remote from the associated participant, such as one or more remote servers. The remotely rendered security camera image data may then be transmitted to the participant over one or more communications networks, such as by using streaming content delivery techniques. Also, in some examples, audio data and other additional data (e.g., metadata, position data, etc.) associated with the security camera may also be remotely generated, rendered and/or transmitted in combination with the security camera image data.

The remote rendering and/or streaming of the security camera image data may offer a number of advantages. For example, in some cases, remote rendering of the security camera image data may allow the security camera image data to be viewed without requiring the use of a game client or other content client program. Rather, in some examples, the streamed security camera image data may be viewed using merely a web browser or another program that allows playing and viewing of rendered image data. In addition, the streamed security camera image data may be viewed by a player without the need to, for example, locally receive and process game state information or to locally render image data, such as by performing geometry operations, shading, texturing, lighting, and other graphics pipeline operations. This may potentially increase the number of different devices on which the security camera image data may be viewed, such as by allowing viewing of the security camera image data on devices that do not have a game client or other content client program installed or accessible as well as devices that may not be capable of suitably locally rendering image data.

Moreover, the ability to view remotely rendered security camera image data offers many other benefits. For example, because a game client or other content client program may not be required to view the remotely rendered security camera image data, there is no requirement that a participant must be connected to and/or actively participating in a content item when viewing the security camera image data. In some examples, this may allow security camera image data to be rendered and viewed at times when an associated participant has logged off from the content item. This may provide numerous benefits. For example, as set forth above, during the course of a game, a players may create or acquire valuable assets (e.g., structures, goods, weapons, currency, or other valuables), and it may sometimes be desirable for a player to be able to view those assets when the player is logged off from the game. This may help to ensure that the assets are not damaged or stolen, for example by other characters or events within the game.

Furthermore, even during times when a participant is logged on to or otherwise actively participating in a game, the remote rendering of security camera image data may still provide many benefits. For example, as set forth above, a game client may often locally render a player view, which may depict a particular portion of the game's entire virtual area, such as a particular portion of the virtual area that surrounds a character controlled by the player. In some cases, however, it may be desirable for a player to view other portions of the virtual area, even when the player's character is not located at or near those other portions. The remote rendering of security camera image data may be advantageous in such cases by allowing the player to view image data for other portions of game's virtual area for which game data has not necessarily been received, loaded, and/or processed by the client device.

In some examples, a security camera may be moved to a different location, panned, tilted and adjusted in any combination of directions, zoomed in and out, or otherwise manipulated in any appropriate manner. For example, a security camera may be assigned to follow a particular asset, character, or other entity within a game. In some examples, a security camera may be assigned to a virtual robot and/or sent on a scouting mission to capture image data of various portions of the virtual area. In some cases, a particular participant or group of participants may have more than one associated security camera whose image data may be remotely rendered and/or streamed. In some examples, instructions may be provided for a particular image data stream to switch between image data for various different security cameras or otherwise manipulate or adjust one or more security cameras.

In some cases, a security camera image data stream may be accessed and viewed using an account and/or authentication information that is the same or similar to authentication information that may be used to enter and participate in the executing content item itself. For example, in some cases, a player may require a particular username and password to log onto an executing video game and control a character within the video game. In some examples, the player may also access an associated security camera image data stream using the same username and password or other authentication information that are used to log on to the game. This may, for example, improve security and ease of use by reducing the amount of authentication information that must be generated and used.

FIG. 1 is a diagram illustrating an example system for in-content security camera data streaming that may be used in accordance with the present disclosure. The example of FIG. 1 includes server components 100 and clients 110A-E, which may communicate with one another, such as over one or more communication networks, including, for example, one or more local area networks (LAN's) and wide area networks (WAN's), such as the Internet. It is noted that server components 100 may be distributed across any number of different servers and/or devices, at any number of different locations, which may themselves communicate over any number of different communications networks.

As shown in FIG. 1, clients 110A-C each include a respective content item client 111A-C, while server components 100 include content item server 140. Content item clients 111A-C and content item server 140 may collectively execute a content item, such as a massively multiplayer online (MMO) video game or other video game. In the example of FIG. 1, the content item is a multi-participant content item, such as a multi-player video game. It is noted, however, that the techniques described herein may also be applied to single-participant content items, such as single-player video games. In some cases, players or other participants operating clients 110A-C may log on or otherwise connect to the content item using content item clients 111A-C. As shown in FIG. 1, client 110A is operated by Participant A, client 110B is operated by Participant B, client 110C is operated by Participant C. In some cases, participants may connect to the content item by providing, via content item clients 111A-C, identity and authentication information, such as a user name and password, which may be matched by server components 100 to an existing username and password for the participant.

In some examples, each content item client 111A-C may, on behalf of a respective player or participant, control a respective character or other participant-controlled entity within the content item. In some cases, each content item client 111A-C may receive participant input information, such as may be provided though one or more user input components (e.g., touch screen, controller, camera, microphone, mouse, keyboard, etc.) at clients 110A-C. For example, participants may provide input for controlling respective characters, such as by performing various actions (e.g., firing a weapon, driving a car, moving from one location to another, etc.). Upon receiving the participant input information, content item clients 111A-C may collect and forward content state data associated with the user input to the content item server 140.

Upon being received by content item server 140, incoming content state data from content item clients 111A-C may be provided to content state manager 146. Content state manager 146 may generally perform operations related to communication of content item state among content item clients 111A-C. For example, in some cases, content state manager 146 may identify an update to content state data from one of content item clients 111A-C and then forward the update to each other content item client 111A-C, such that each of content item clients 111A-C are able to update and maintain respective versions of the state of the content item. For example, each of content item clients 111A-C may, in some cases, receive, from content state manager 146, updates regarding actions performed by other characters controlled by other content item clients 111A-C.

In addition to forwarding information about participant-controlled characters, content item server 140 may also provide, to content item clients 111A-C, information about other objects within a virtual area of the content item. For example, content item server 140 may provide information about objects such as trees, clouds, lakes, rives, cliffs, birds, fish, animals, structures, vehicles, non-player characters (NPC's), and many other objects. The provided information may include, for example, any information associated with rendering of the objects at the respective clients 110A-C, such as location, orientation, size, color, texture, shading, lighting, reflectivity, associated audio data, and any other associated information.

Upon being received by content item clients 111A-C, the state, object, and other content item information from content item server 140 may be processed and then used to render image data, such as video data, associated with the content item. In particular, content item clients 111A-C may provide the received content item information to respective content rendering components 112A-C for rendering of image data, such as video data, associated with the content item. In greater detail, for example, content rendering components 112A-C may include one or more graphics processing units (GPU's) for rendering of image data, such as video data, as well as various audio processing components for processing and rendering of audio data. As should be appreciated, the GPU's and/or other image data processing components may perform various graphics rendering operations, such as geometry operations, shading, texturing, lighting, and other graphics pipeline operations. Upon being rendered, the image and audio data associated with the content item may be presented using one or more output devices (e.g., display screen, speakers, etc.).

Thus, clients 110A-C may use the state, object, and other content item information from content item server 140 to render image and audio data associated with the executing content item. As set forth above, however, an entire virtual area associated with a content item may often include a large and complex amount of space. Accordingly, clients 110A-C typically do not render the entire virtual area associated with the content item. Rather, clients 110A-C will each typically only render a portion of the virtual area that is of particular interest to the respective clients 110A-C. In some examples, each client 110A-C may render a portion of the virtual area that surrounds a character controlled by the respective client 110A-C. Thus, it is typically not necessary for each client 110A-C to receive and process content item information for the entire virtual area associated with the content item. Rather, in some examples, clients 110A-C may only request, receive, and process content item information that is included within or near their respective areas of interest. This may significantly reduce that amount of state, object and other content item information that is transmitted from content item server 140 to each client 110A-C and processed by each client 110A-C. The portion of a virtual area that is rendered locally by each client 110A-C is referred to hereinafter as a client-rendered view.

As set forth above, in some cases, however, it may be desirable for a participant to view portions of the virtual area that are not included within the client-rendered view. Additionally, it may be desirable for players to continue to view certain portions of the virtual area even when the participant has logged out and is not actively participating in the game. For example, if a player's character has created or acquired valuable assets (e.g., structures, goods, weapons, currency, or other valuables), it may sometimes be desirable for a player to be able to view those assets when the player is not logged off and/or the player's character is not located at or near those assets. This may help to ensure that the assets are not damaged or stolen, for example by other characters or events within the game.

For these and other reasons, the system shown in FIG. 1 allows a security camera to be inserted into an executing content item, such as a video game. The security camera may be associated with a particular participant, such as a player, of the video game or other content item. In the particular example of FIG. 1, an inserted security camera is associated with Participant C who, as set forth above, operates client 110C. In some examples, the security camera may be active during times when Participant C is connected to and/or actively participating in the executing content item, such as by logging on to the content item via respective content item client 111C. Also, in some examples, the security camera may be active during times when Participant C is not connected to and/or not actively participating in the executing content item, such as by logging off from the content item via respective content item client 111C.

In some examples, security cameras and associated features may be made available to all participants of a content item. In other examples, security cameras and associated features may be made available to participants for a fee, via subscription to a service, and/or via any other appropriate cost-based model. In yet other examples, security cameras and associated features may be made available to participants based on their performance within the content item, such as by acquiring points or assets within a video game, moving up to a next game level, winning a battle, defeating an enemy, and the like. Any combination of these or other models may be employed for determining when a participant may be permitted to activate security cameras and associated features.

In some cases, a participant may provide, for example via content item clients 111A-C, data indicating a particular location within a virtual area of the content item at which a security camera is to be virtually installed. In some cases, the participant may verbally describe the location, for example by typing or speaking text such as, "install a security camera at the entrance to my castle" or "install a security camera in my car." Also, in some cases, a participant may perform various actions to virtually install a security camera, such as by moving a respective character to a particular virtual location at which the security camera is to be virtually installed. In some examples, a security camera may be depicted by a graphical object within the virtual area that may be acquired, installed, moved, and adjusted by characters and other entities within the content item. Participants may also be permitted to set and adjust various features of security cameras, such as direction, angle, zoom, field of view, and others, using, for example, any combination of character-controlled, textual, speech, gesture, menu-based and/or other control commands. Some additional example techniques for virtually installing, moving and/or adjusting of security cameras are described in greater detail below.

In addition to installing, moving, and adjusting of security cameras, participants may also provide data indicating when, or under what circumstances, a security camera is to be activated and/or deactivated. In some examples, during game play or other content participation, a participant may provide a particular command to activate and/or deactivate one or more security cameras. Also, in some examples, a participant may provide a command to activate a security camera when certain conditions are met, such as when an opposing character moves within a certain distance of a camera or at other specified events or times. Also, in some examples, a participant may provide a command to automatically activate a security camera upon log off or disconnection by the participant from the content item. In other examples, a security camera may be activated only when a participant or other authorized user logs on or otherwise connects to the security camera image data transmission, as will be described in greater detail below.

Thus, as set forth above, participants may, for example via content item clients 111A-C, provide various security camera data, such as data indicating virtual locations, directions, angles, zooms, fields of view, activation instructions, and associated participants for security cameras. Security camera data may be received by content item server 140 from participants and/or other parties and may be collected and stored as security camera data 145. Security camera data 145 may then be used, for example by content item server 140 and security camera components 180, to generate and provide security camera views, such as will now be described in detail.

In some examples, content item server 140 may, based at least in part on security camera data 145, determine when various conditions are met for activating a security camera. As set forth above, such conditions may include a participant log off from and/or log on to the content item, movement of an opposing character within a specified proximity of the security camera, and various other specified events or times. In some cases, upon determining that a security camera is to be activated, content item server 140 may request a launch of a security camera manager 150 to manage generation of the security camera view. In particular, content item server 140 may pass, to security camera manager 150, security camera data associated with the corresponding security camera, such as data indicating its virtual location, direction, angle, zoom, field of view, activation instructions, and associated participant.

Security camera manager 150 may then request, from content item server 140, content item information for rendering the security camera view. The content item information requested by security camera manager 150 may, in some examples, include content item information similar to that which is requested and received by content item clients 111A-C, such as information about actions performed by various characters, other content item state information, and information for rendering various objects within the virtual area of the content item, such as location, orientation, size, color, texture, shading, lighting, reflectivity, associated audio data, and any other associated information. In some examples, similar to how content item clients 111A-C may each request and receive content item information associated with their respective client-rendered views, security camera manager 150 may request and receive information associated with the security camera view, such as information associated with objects that are within or adjacent to the field of view of the security camera.

Upon receiving the state, object, and other content item information associated with the security camera view, security camera manager 150 may provide the received content information to proxy rendering components 160 for rendering of image and audio data associated with the security camera view. In some examples, proxy rendering components 160 may include one or more graphics processing units (GPU's) for rendering of video and other image data, as well as various audio processing components for processing and rendering of audio data. As should be appreciated, the GPU's and/or other image data processing components may perform various graphics rendering operations, such as geometry operations, shading, texturing, lighting, and other graphics pipeline operations. In some examples, proxy rendering components 160 may include GPU's and other rendering components that may be more powerful and/or sophisticated than content rendering components 112A-C on clients 110A-C.

Upon being rendered, the image and audio data associated with the security camera view may be provided to streaming transmission components 170, which may transmit the image and audio data to clients 110C-E over one or more communications networks using streaming content delivery techniques, in which data may be transmitted and may potentially be processed and/or presented in a steady flow. In some examples, streaming transmission components 170 may be operated by a video game or other streaming content delivery service. Upon being received by clients 110C-E, the streamed image and audio data may be presented to Participant C and/or other authorized viewers by respective stream playback components 113C-E via output components, such as a display screen and audio speakers. Stream playback components 113C-E may generally include any components that are capable of playing streamed image and audio data, such as a web browser, various well-known video and/or audio players, and the like. Also, in some examples, the streamed security camera image and audio data may be played back using and/or otherwise integrated into a content item client program, but it is noted, however, that the content item client program is not specifically required for playing of the streamed security camera image and audio data.

In some examples, in order to access the streamed security camera image and audio data, account and/or authentication information may be required. As set forth above, in some cases, the account and/or authentication information may be the same or similar to authentication information that may be used to enter and participate in the executing content item itself. For example, in some cases, a player may require a particular username and password to log onto an executing video game and control a character within the video game. In some examples, the player may also access an associated security camera image data stream using the same username and password that are used to log onto the game. This may, for example, improve security and ease of use by reducing the amount of authentication information that must be generated and used.

In some examples, in addition or as an alternative to image and/or audio data, other additional data, such as metadata, associated with the security camera may also be generated and captured by one or more servers and transmitted to one or more clients. For example, additional data associated with the security camera may be streamed by one or more servers to one or more clients in combination with the security camera image and/or audio data. Some examples of this additional data may include weather data, time and date data, durability of goods data, player status data, player bank status data, position data associated with characters and objects, and other data. In some examples, this additional data may be used by thicker/richer clients or other clients or components to perform various operations associated with the security camera view, such as providing various options to viewers whose availability may be based at least in part on player status or player bank status, adjusting the image or audio data based on weather, time, and date, and many other operations.

In the particular example of FIG. 1, there are three content item clients 111A-C executing on three respective clients 110A-C. It is noted, however, that the depiction of three content item clients and three respective clients is merely an example and that the security camera techniques described herein may be employed for content items with any number content item clients executing on any number of client devices operated by any number of participants. Moreover, in the particular example of FIG. 1, the security camera image and audio data is streamed for presentation on three different clients 113A-C. It is noted, however, that the streaming of security camera image and audio data to three different clients 113A-C is merely an example and that security camera image and audio data may be streamed to any number of different clients at the same or different times.

Thus, as shown in FIG. 1, security camera image data may be rendered by server components 100, which may be remote from any or all of clients 110A-E. As set forth above, the remote rendering and/or streaming of the security camera image data may offer a number of advantages. For example, the remote rendering of the security camera image data may allow the security camera image data to be viewed on stream playback components 113A-C without requiring the use of content item client 111C or another content item client program. In addition, the streamed security camera image data may be viewed by a player without the need to, for example, locally receive and process game state information or to locally render image data. As set forth above, this may potentially increase the number of different devices on which the security camera image data may be viewed, such as by allowing viewing of the security camera image data on devices that do not have a game client or other content client program installed or accessible as well as devices that may not be capable of suitably locally rendering image data.

As also set forth above, because a content item client program is not required to view the remotely rendered security camera image data, there is no requirement that a participant must be connected to and/or actively participating in a content item when viewing the security camera image data. In some examples, this may allow security camera image data to be viewed at times when an associated participant has logged off from the content item, for example to help ensure that the participant's assets are not damaged or stolen, for example by other characters or events within the game. Moreover, even during times when a participant is logged on to or otherwise actively participating in a game, the remote rendering of security camera image data may still provide additional benefits, such as allowing the participant to view image data for other portions of game's virtual area for which game data has not necessarily been received, loaded, and/or processed by the client device.

Figure 2:
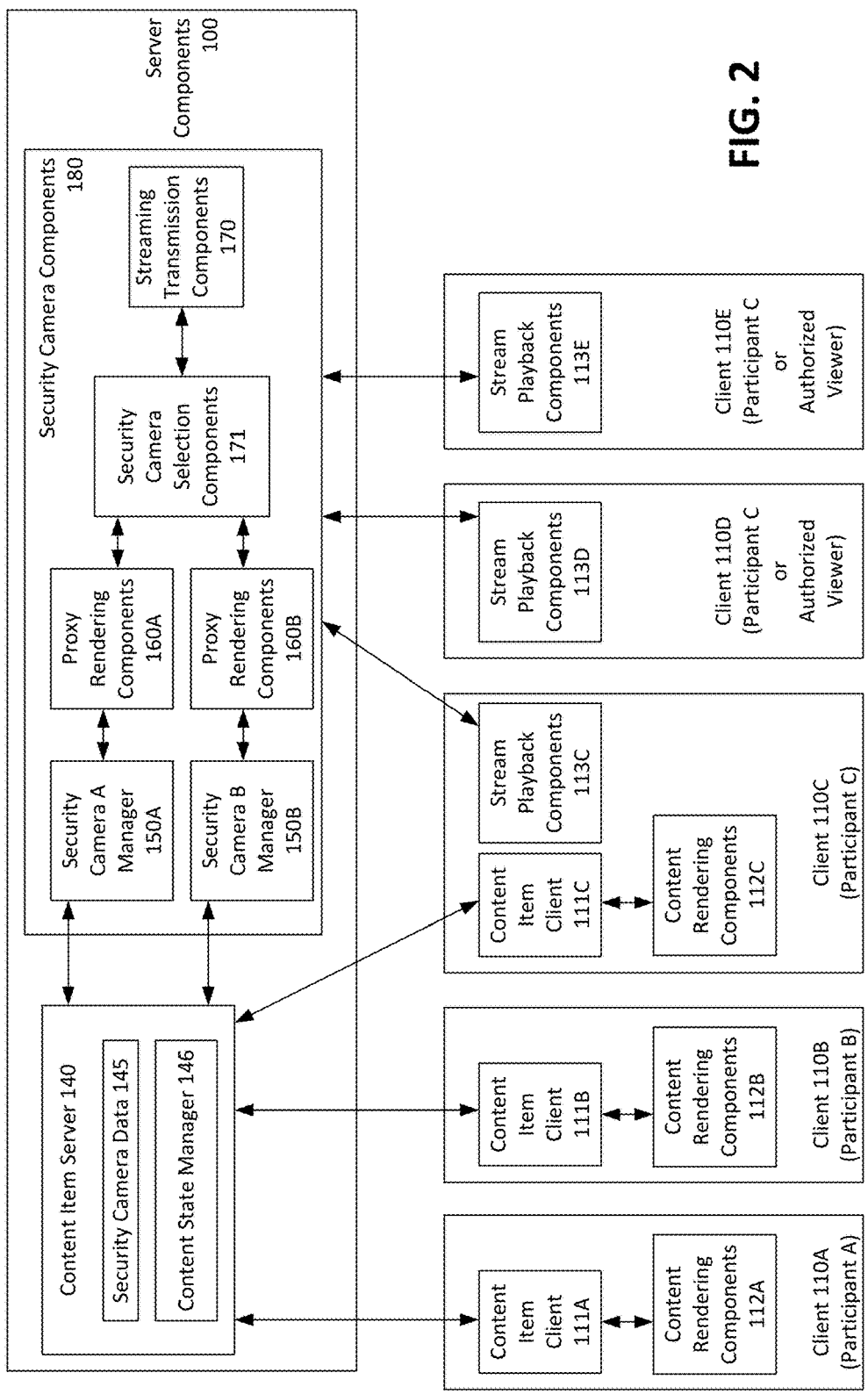
FIG. 2 is a diagram illustrating an example system for in-content security camera data streaming with multiple cameras that may be used in accordance with the present disclosure.

In the particular example of FIG. 1, image and audio data for a single security camera are streamed from server components 100 to clients 110C-E. It is noted, however, that the techniques disclosed herein may be employed for streaming of image and audio data or any number of different security cameras. FIG. 2 is a diagram illustrating an example system for in-content security camera data streaming with multiple cameras that may be used in accordance with the present disclosure. As shown in FIG. 2, security camera components 180 of FIG. 2 include two security camera managers 150A-B and two proxy rendering components 160A-B associated with different security cameras (Security Camera A and Security Camera B). Specifically, security camera manager 150A and proxy rendering components 160A are associated with Security Camera A, while security camera manager 150B and proxy rendering components 160B are associated with Security Camera B. The operations performed by security camera managers 150A-B and proxy rendering components 160A-B may be similar, for each of their respective security cameras, to those performed by security camera manager 150 and proxy rendering components 160 in the single security camera example of FIG. 1. These operations are described in detail above and are not repeated here.

In combination with multiple security cameras and respective elements 150A-B and 160A-B, security camera components 180 of FIG. 2 further include security camera selection components 171. Generally, security camera selection components 171 may receive input, for example from one or more connected clients, for selecting, switching between, and/or combining rendered data associated with multiple security cameras (e.g., Security Cameras A and B in this example). In particular, security camera selection components 171 may manage the contents of a transmitted data stream by selecting camera data sources for the transmitted data stream, switching the transmitted data stream between multiple camera data sources and/or combining multiple camera data sources into the transmitted data stream.

As an example, a transmitted data stream may begin transmission with security camera selection components 171 inserting, into the stream, rendered data associated with Security Camera A (without including rendered data associated with Security Camera B). At some point during the transmission of the stream, security camera selection components 171 may receive a command to switch the contents of the stream from Security Camera A to Security Camera B. Security camera selection components 171 may respond by ceasing to insert, into the stream, rendered data associated with Security Camera A and, instead, inserting rendered data associated with Security Camera B. Additionally, at a subsequent time, security camera selection components 171 may receive a subsequent command to switch the contents of the stream back from Security Camera B to Security Camera A. Security camera selection components 171 may respond by ceasing to insert, into the stream, rendered data associated with Security Camera B and, instead, inserting rendered data associated with Security Camera A.

As another example, security camera selection components 171 may receive a command to periodically switch or rotate between various camera views, and security camera selection components 171 may then periodically switch or rotate the contents of the transmitted data stream between rendered data associated with the various camera views. As yet another example, security camera selection components 171 may receive a command to simultaneously combine multiple camera views into the transmitted data streams, such as by assigning rendered data from different camera views to various different portions of a transmitted image or frame. The relative locations, sizes, and other attributes of the portions of a transmitted image or frame to which rendered data from different camera views are assigned may be set and adjusted by security camera selection components 171, for example based on client input.

Figure 3:
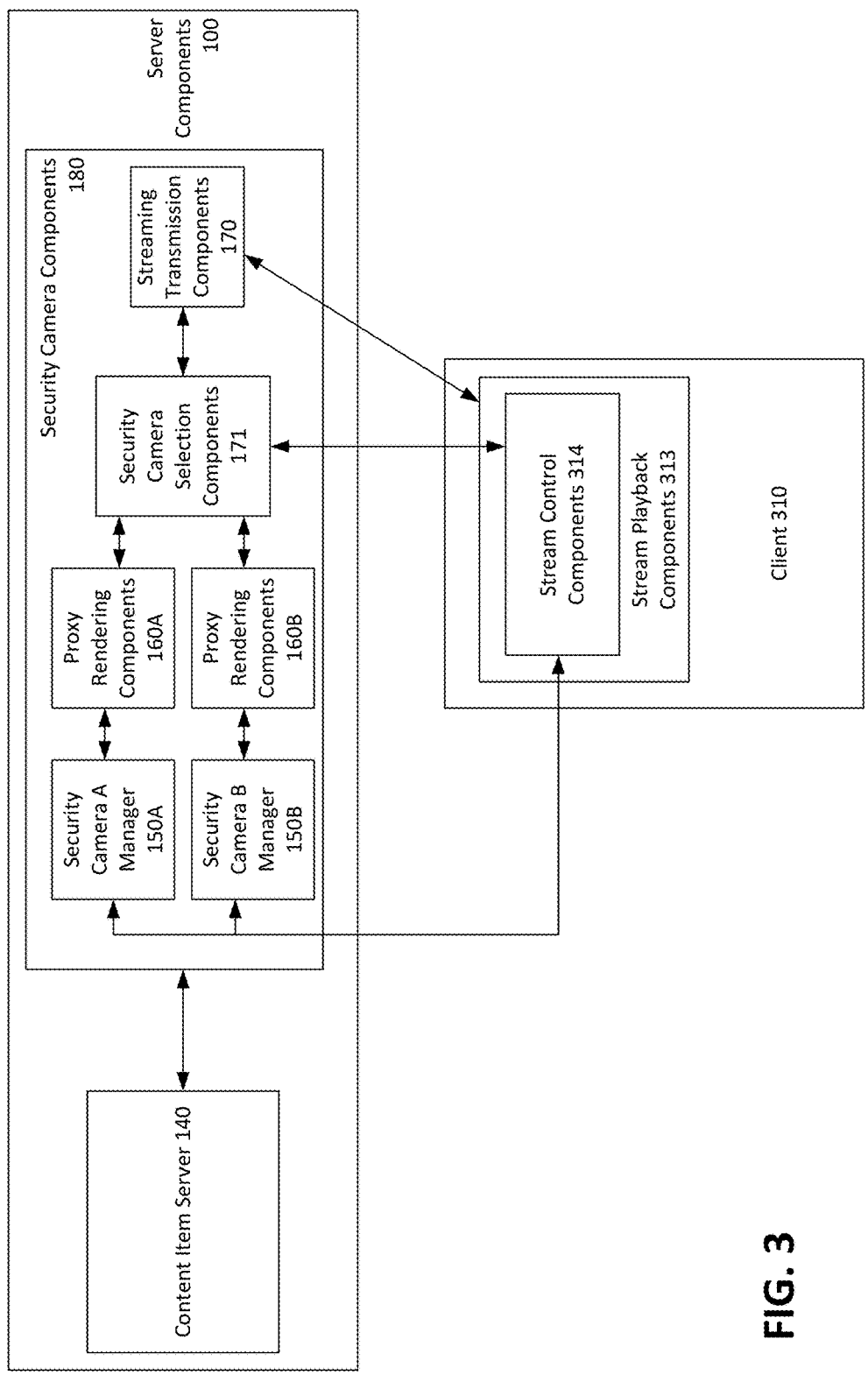
FIG. 3 is a diagram illustrating an example system for client control of security camera streaming that may be used in accordance with the present disclosure.

Thus, as set forth above, one or more security cameras may be controlled, such as by moving, adjusting, selecting, switching, combining, or otherwise manipulating the one or more security cameras and/or their associated rendered data. As also set forth above, the one or more security cameras may be controlled, for example, based on commands or other inputs received from one or more clients. Some example aspects of client control of security camera streaming will now be described in detail. In particular, FIG. 3 is a diagram illustrating an example system for client control of security camera streaming that may be used in accordance with the present disclosure. As shown, FIG. 3 includes an example client 310 in communication with server components 100. Client 310 includes a stream playback components 313, which may be operated in a similar manner as any or all of stream playback components 113C-E of FIGS. 1 and 2. In particular, stream playback components 113 may include, for example, a web browser or other components that enable playing of streaming audio and/or image data.

In the example of FIG. 3, stream playback components 313 include stream control components 314, which may generally interact, directly or indirectly, with security camera managers 150A-B, security camera selection components 171, and/or other elements of server components 100 to provide client control of security camera streaming. For example, in some cases, stream control components 314 may send instructions to security camera selection components 171 to switch a transmitted stream from one security camera to another, to periodically switch or rotate security cameras for the transmitted stream, to simultaneously combine data from multiple security cameras into the transmitted stream, to set or adjust attributes for combining the security camera data in different portions of a frame, and to perform other security camera stream control operations.

As another example, stream control components 314 may send instructions to security camera managers 150A-B to set or adjust one or more security camera parameters, such as location, direction, angle, pan, tilt, zoom, field of view, and others. For example, stream control components 314 may send instructions to security camera manager 150A to pan Security Camera A left or right, to tilt Security Camera A up or down, or to zoom Security Camera A in or out. As another example, stream control components 314 may send instructions to security camera manager 150B to move Security Camera B to another location, such as a different room or floor or in a particular direction. As yet another example, stream control components 314 may send instructions to security camera manager 150A to move Security Camera A to follow a particular character or object or to go on a scouting mission to a particular area or location.

It is noted that, while only a single client 310 is shown in FIG. 3, security camera data may be streamed to any number of connected clients, any number of which may be capable of controlling, or in some cases not controlling, any of the above described or other aspects of security camera streaming. As set forth above, in some examples, a data stream including security camera data may be provided to a streaming content delivery service, which may deliver content to various broadcasters, spectators, and other users. For example, in some cases, a particular user, referred to herein as a broadcaster, may control an image data stream that is transmitted to both the broadcaster and to other users, referred to herein as spectators, that do not control the image data stream. In some examples, the broadcaster may be capable of moving, adjusting, switching, and combining security cameras and/or their rendered data, while the spectators may not be capable of performing such operations. Additionally, in some examples, the broadcaster may temporarily grant rights or permissions to one or more spectators to perform one or more security camera control operations. For example, the broadcaster may temporarily allow one or more spectators to move, adjust, switch, and combine security cameras and/or their rendered data.

In one specific example, a broadcaster may rely on one or more spectators to monitor one or more security cameras during times when the broadcaster is not able to access the security camera image data streams or is otherwise not available. In some cases, during these times, the broadcaster may grant the spectators permission to control the broadcaster's image data stream. For example, the spectators may be permitted to switch the transmitted image data stream from one security camera view to another, to move, tilt, pan, zoom or otherwise adjust one or more security cameras, and to perform other operations.

In some examples, the spectators may provide security camera control commands using chat functionality that may sometimes be employed by data streaming services to allow communications among viewers of a stream. For example, in some cases, spectators and other users may send messages using chat functionality to issue commands for controlling one or more security cameras, such as commands to switch the transmitted image data stream from one security camera view to another, to move, tilt, pan, zoom or otherwise adjust one or more security cameras. In some cases, users may control the camera using specified defined camera control commands that may be recognized and understood by a streaming service. The service may monitor chat communications to detect such commands and then employ the issued commands to generate instructions for security camera components, such as security camera managers 150A-B and security camera selection components 171. This may be advantageous to users by, for example, allowing camera control using the same or similar chat communications functionality that allows users to collectively communicate, such as discuss and comment, about the streamed camera views. For example, this may allow spectators to work together to collectively monitor security cameras and to control the cameras using familiar and convenient chat functionality.

Figure 4:
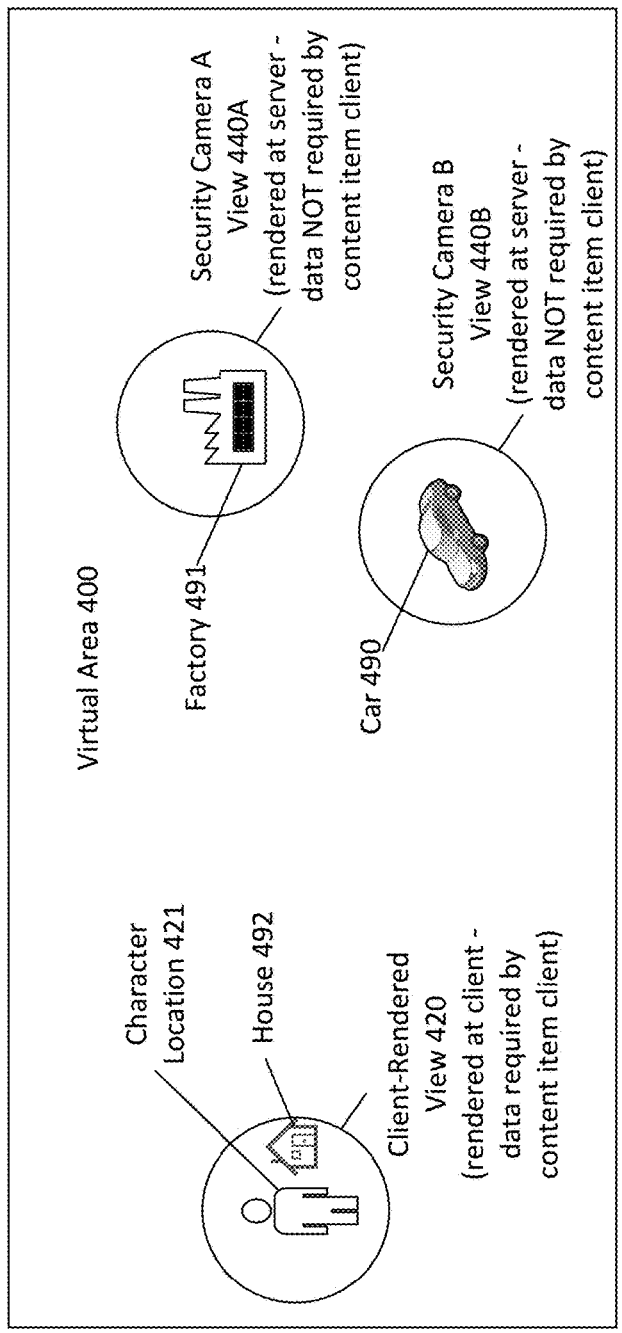
FIG. 4 is a diagram illustrating example security camera and client-rendered views of a virtual area that may be used in accordance with the present disclosure.

Thus, as set forth above, one or more security cameras may be controlled by, for example, one or more stream control components 314, one or more content item clients 111A-C and/or other components. Some examples of security camera views will now be described in detail. In particular, FIG. 4 is a diagram illustrating example security camera and client-rendered views of a virtual area that may be used in accordance with the present disclosure. Specifically, FIG. 4 depicts an example of two security camera views 440A and 440B of a virtual area 400 of an executing content item that are captured when an associated participant is currently logged on and actively participating in the content item. As shown, view 440A corresponds to Security Camera A, while view 440B corresponds to Security Camera B. As set forth above, in some examples, Security Cameras A and B may be installed to provide views of various assets (e.g., structures, goods, weapons, currency, or other valuables) that are created or acquired by a character. In the example of FIG. 4, Security Camera A view 440A includes a factory 491, while Security Camera B view 440B includes a car 490.

As also shown in FIG. 4, a client-rendered view 420 of virtual area 400 is captured simultaneously with the security camera views 440A-B. In the example of FIG. 4, client-rendered view 420 surrounds a character location 421 for a character that is operated by the content item participant with whom the security camera views 440A-B are associated. Also, in the example of FIG. 4, client-rendered view 420 includes a house 492. The client-rendered view 420 is rendered by the client, and, therefore, data for rendering of the client-rendered view 420 (e.g., content item state data and data associated with various objects within or near client-rendered view 420) is required by the content item client for rendering of the client-rendered view at the client device. As set forth above, data for rendering of the client-rendered view 420 may be transmitted from a content item server to the content item client using one or more communications networks. As also shown in FIG. 4, the security camera views 440A-B are rendered at the server, and, therefore, data for rendering of the security camera views 440A-B is not required by the content item client. Thus, as set forth above, remote server rendering of security camera views 440A-B may allow the security camera views 440A-B to be presented on a client device even when the client device does not necessarily receive, load, or process view data for the security camera view 440A-B (e.g., state data, object data, or other content item data regarding the security camera views 440A-B).

Figure 5A:
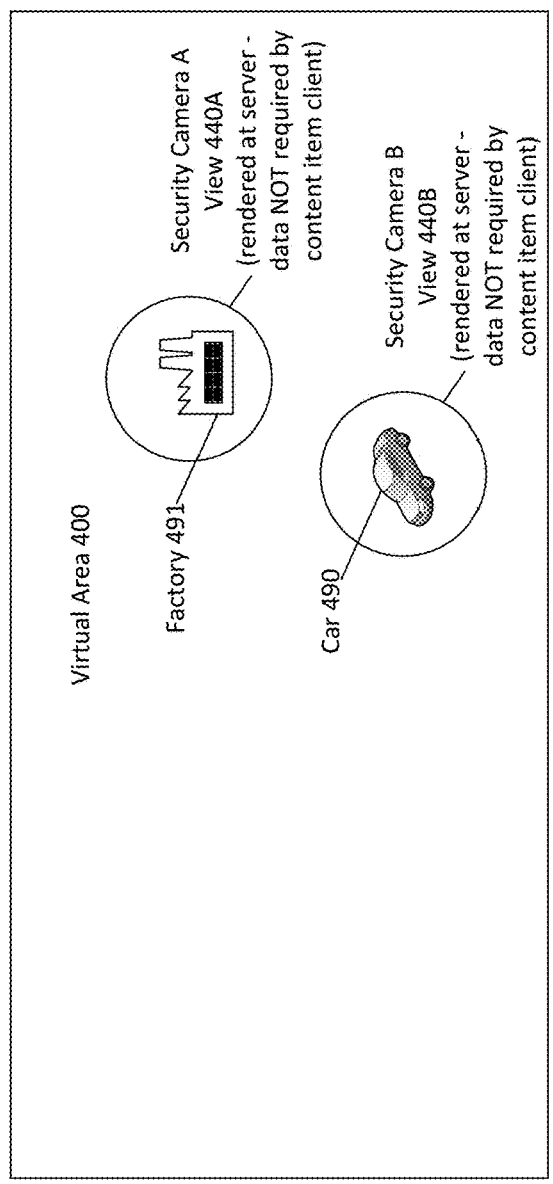
FIG. 5A is a diagram illustrating example security camera views of a virtual area for a logged off participant that may be used in accordance with the present disclosure.
Figure 5A:
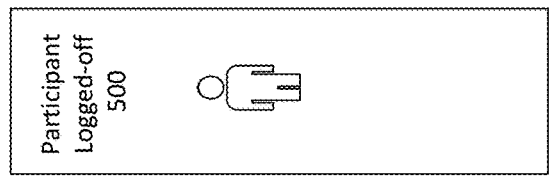

As also set forth above, in addition to providing views of a virtual area during times when an associated participant is logged on and/or actively participating in an executing content item, security cameras may also provide views of a virtual area during times when an associated participant is logged off and/or not actively participating in an executing content item. In particular, FIG. 5A is a diagram illustrating example security camera views of a virtual area for a logged off participant that may be used in accordance with the present disclosure. As shown in FIG. 5A, box 500 indicates that a participant associated with security camera views 440A-B has logged off from the executing content item. Accordingly, client-rendered view 420 of FIG. 4 is not captured in the example of FIG. 5A and is not included in virtual area 400 of FIG. 5A. As set forth above, however, because security camera views 440A-B are rendered remotely at one or more servers, security camera views 440A-B may be captured even during times when an associated participant is not logged on to and/or actively participating in an executing content item. This may allow an associated participant that has logged off from the content item to continue to monitor security camera views 440A-B, for example to help ensure that the participant's assets are not damaged or stolen, for example by other characters or events within the game.

Figure 5B:
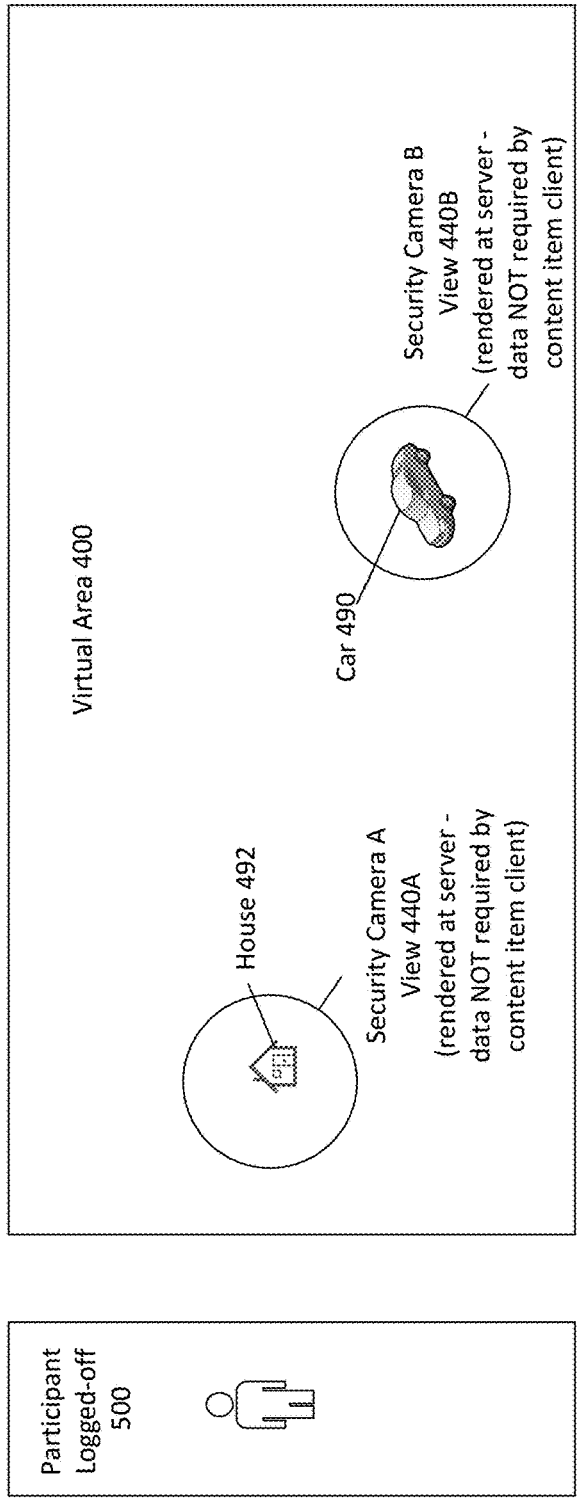
FIG. 5B is a diagram illustrating example adjustment of a security camera view of a virtual area that may be used in accordance with the present disclosure.

Additionally, as set forth above, one or more security camera views may be adjusted, such as by adjusting a location, direction, angle, pan, tilt, zoom, field of view, or other attributes of a virtual security camera. FIG. 5B is a diagram illustrating example adjustment of a security camera view of a virtual area that may be used in accordance with the present disclosure. As shown, Security Camera A has been moved from its prior location associated with factory 491 shown in FIG. 5A and moved to a new location associated with house 492. For example, commands to adjust security camera views may be issued, for example by stream control components 314, content item clients 111A-C, and other components, and provided to security camera managers 150A-B and other components. Furthermore, as described above, security cameras may be assigned to move such that they follow a specified character or other entity or may be assigned to perform a scouting mission or other movements to one or more different portions of a virtual area.

Figure 6:
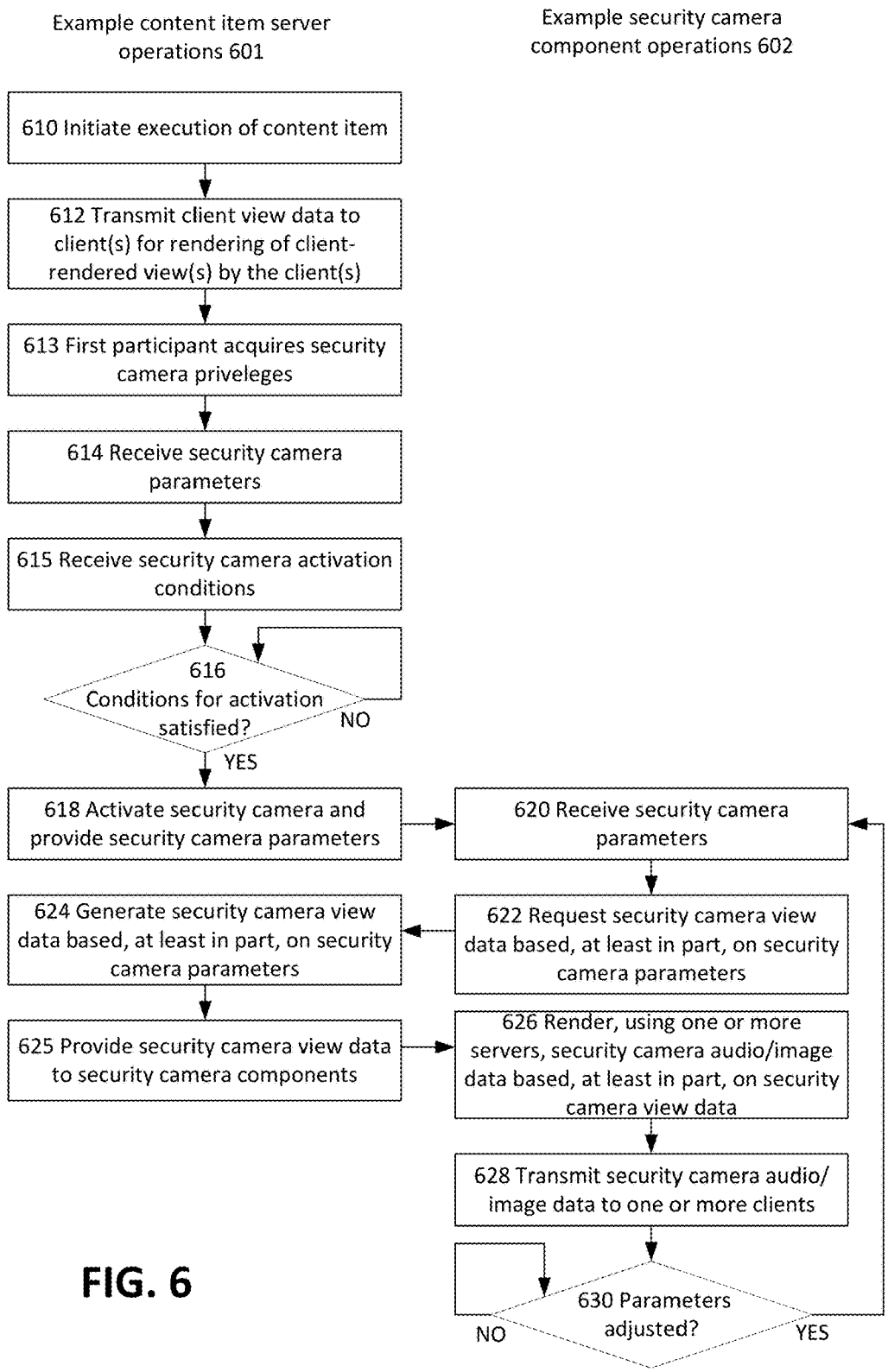
FIG. 6 is a flowchart illustrating an example process for providing a server-rendered security camera view for a content item that may be used in accordance with the present disclosure.

Some example processes for providing and controlling of security camera views will now be described in detail. In particular, FIG. 6 is a flowchart illustrating an example process for providing a server-rendered security camera view for a content item in accordance with the present disclosure. The content item may have one or more participants associated with one or more client-rendered views. As shown, operations 601 on the left side of FIG. 6 are example content item server operations that may, in some examples, be performed by content item server 140 of FIGS. 1-3. Operations 602 on the right side of FIG. 6 are example security camera component operations that may, in some examples, be performed by security camera components 180 of FIGS. 1-3. The process of FIG. 6 begins at operation 610, at which execution of a content item is initiated. As set forth above, the content item may be for example, a video game or other electronically presented media item. As also set forth above, the content item may have one or more associated participants, such as one or more players of a video game. The content item may, for example, be executed collectively by one or more servers and one or more clients. In some examples, each participant of the content item may log on to or otherwise access the content item from a respective associated client device. Each connected client may, for example, provide a respective client-rendered view. In some examples, each client-rendered view may be associated with a respective participant. Each client-rendered view may be a view of a portion of a virtual area associated with the content item, such as a view of a portion the virtual area surrounding a character or other entity controlled by the respective participant.

At operation 612, client view data is transmitted to one or more client devices for rendering of one or more client-rendered views by the one or more connected client devices. The client view data may be transmitted, for example, from a content item server to the one or more content item clients on the one or more connected client devices over one or more communications networks. The client view data may include data that is used for rendering of the one or more client-rendered views by the one or more connected clients. As set forth above, client view data may include, for example, content item state information, position and other information about one or more objects within or adjacent to a client-rendered view, and other information associated with the content item.

At operation 613, a first participant of the content item may acquire security camera privileges. As set forth above, in some examples, security cameras and associated features may be made available to all participants of a content item and operation 614 may be satisfied automatically upon their joining or participating in a content item. In other examples, security cameras and associated features may be made available to participants for a fee, via subscription to a service, or based on their performance within the content item, such as by acquiring points or assets within a video game, moving up to a next game level, and the like.

At operation 614, security camera parameters are received. As set forth above, security camera parameters may include information regarding a security camera view, such as information regarding at least one of location, direction, angle, pan, tilt, zoom, or field of view associated with the security camera view. In some other examples, the security camera parameters may indicate that the camera is to follow a particular character or other entity within the content item and/or perform scouting operations to various portions of a virtual area associated with the content item. Some more specific examples of security camera parameters are described in detail above and are not repeated here.

At operation 615, security camera activation conditions are received. As set forth above, the security camera activation conditions may indicate times or other conditions during which a security camera is to be activated or deactivated. For example, the security camera activation conditions may indicate that a security camera is to be activated or deactivated when a participant is logged on and/or logged off from the content item, at certain times of day, or when other conditions are met, such as when an opponent character moves within a proximity of the security camera. Some more specific examples of security camera parameters are described in detail above and are not repeated here. As set forth above, in some examples, security camera parameters and/or security camera activation conditions may be stored in security camera data 145 of FIGS. 1 and 2.

At operation 616, it is determined whether one or more conditions are satisfied for activating the security camera associated with the first participant. For example, the content item server may monitor events and conditions associated with an executing content item and may determine, based at least in part on the security camera activation conditions, when one or more conditions for activating the security camera are satisfied. As a specific example, in some cases, the security activation conditions may indicate that a security camera is to be activated when the first participant logs off from the content item, and the content server may then detect when the first participant has logged off and responsively activate the first participant's security camera. When one or more conditions for activating the security camera are satisfied, the security camera associated with the first participant may be activated and the security camera parameters may be provided by the content item server to the security camera components at operation 618.

At operation 620, the security camera parameters are received by the security camera components. At operation 622, the security camera components may request security camera view data based, at least in part, on the security camera parameters. For example, as set forth above, a security camera manager component (e.g., security camera manager 150 of FIG. 1) may request security camera view data for its respective security camera from the content item server. The security camera view data may include data that is used for rendering of the security camera view by the security camera components. As set forth above, security camera view data may include, for example, content item state information, information about one or more objects within or adjacent to a security camera view, and other information associated with the content item. In some examples, as part of requesting security camera view information, the security camera manager may provide, to the content item server, security camera parameters, such as the location, direction, angle, pan, tilt, zoom, or field of view associated with the security camera view within the virtual area of the content item.

At operation 624, the content item server generates security camera view data based, at least in part, on the security camera parameters, and, at operation 625, the content item server provides the security camera view data to the security camera components. For example, the content item server may use information about the field of view of the security camera and information about the position of objects within the virtual area of the content item to determine which objects are within or adjacent to the field of view of the security camera. Information about these objects may then be provided to the security camera manager for rendering of the security camera view. Additionally, content item state information and other content item information associated with the security camera view may also be provided to the security camera manager.

At operation 626, the security camera components render, using one or more servers, security camera image and/or audio data based, at least in part, on the security camera view data. For example, as set forth above, the security camera manager may pass the received security camera view data to proxy rendering components, such as one or more graphics processing units and/or audio processing units, for rendering of the security camera image and/or audio data. As set forth above, rendering may include, for example, performing geometry operations, shading, texturing, lighting, and other graphics pipeline operations. As also set forth above, depending upon the security camera activation conditions, the security camera image and/or audio data may be rendered during at least part of a time that the first participant is logged on to the content item and/or during at least part of a time that the first participant is logged off from the content item.

At operation 628, the security camera audio and/or image data is transmitted, for example using streaming content delivery techniques, to one or more clients. In some examples, the security camera audio and/or image data may be transmitted by a content streaming service, and may be transmitted to various broadcasters, spectators, and other users. As set forth above, the clients to which the security camera audio and/or image data is transmitted may include the same client on which the first participant logs on to the content item and/or different clients. Thus, the security camera audio and/or image data may be received and processed by an additional device other than a client device that receives the client view data and that renders and presents the client-rendered view. As also set forth above, there is no requirement that the security camera audio and/or image data must be transmitted to a client device on which a content item client program, such as a content item client 111A-C of FIG. 1, is executing. Rather, in some examples, the security camera audio and/or image data may be received and played using any components that allow receiving and playing of streaming audio and/or image data, such as a web browser, media player, or other components. In some examples, in order to access the security camera audio and/or image data on a client, a user may be required to provide identification and/or authentication information, such as a username and password. Also, in some examples, the security camera audio and/or image data is accessible on the one or more clients based, at least in part, on information associated with the first participant, such as identity and/or authentication information that is used to log on to the content item as the first participant. As set forth above, in some examples, in addition to image and/or audio data, other additional data, such as metadata, associated with the security camera or other server-rendered view may also be generated and captured by one or more servers and transmitted to one or more clients. For example, additional data associated with the security camera may be streamed by one or more servers to one or more clients in combination with the security camera image and/or audio data. Some examples of this additional data may include weather data, time and date data, durability of goods data, player status data, player bank status data, position data associated with characters and objects, and other data. Some example uses for this additional data are identified above and are not repeated here.

At operation 630, it is determined whether the security camera parameters are adjusted. For example, a security camera may be moved to a different location and may also be adjusted by changing its direction, angle, pan, tilt, zoom, field of view, or other parameters. As set forth above, in some examples, security camera parameters may be adjusted by a client that is playing the security camera audio and/or image data, such as by using stream control components 314 of FIG. 3. Additionally, security camera parameters may be adjusted by a participant that is logged on to the executing content item, such as by using content item clients 111A-C of FIGS. 1-2. In these or other cases, the adjusted security camera parameters may, for example, be provided to the security camera manager for requesting of security camera view data based on the adjusted security camera parameters.

Figure 7:
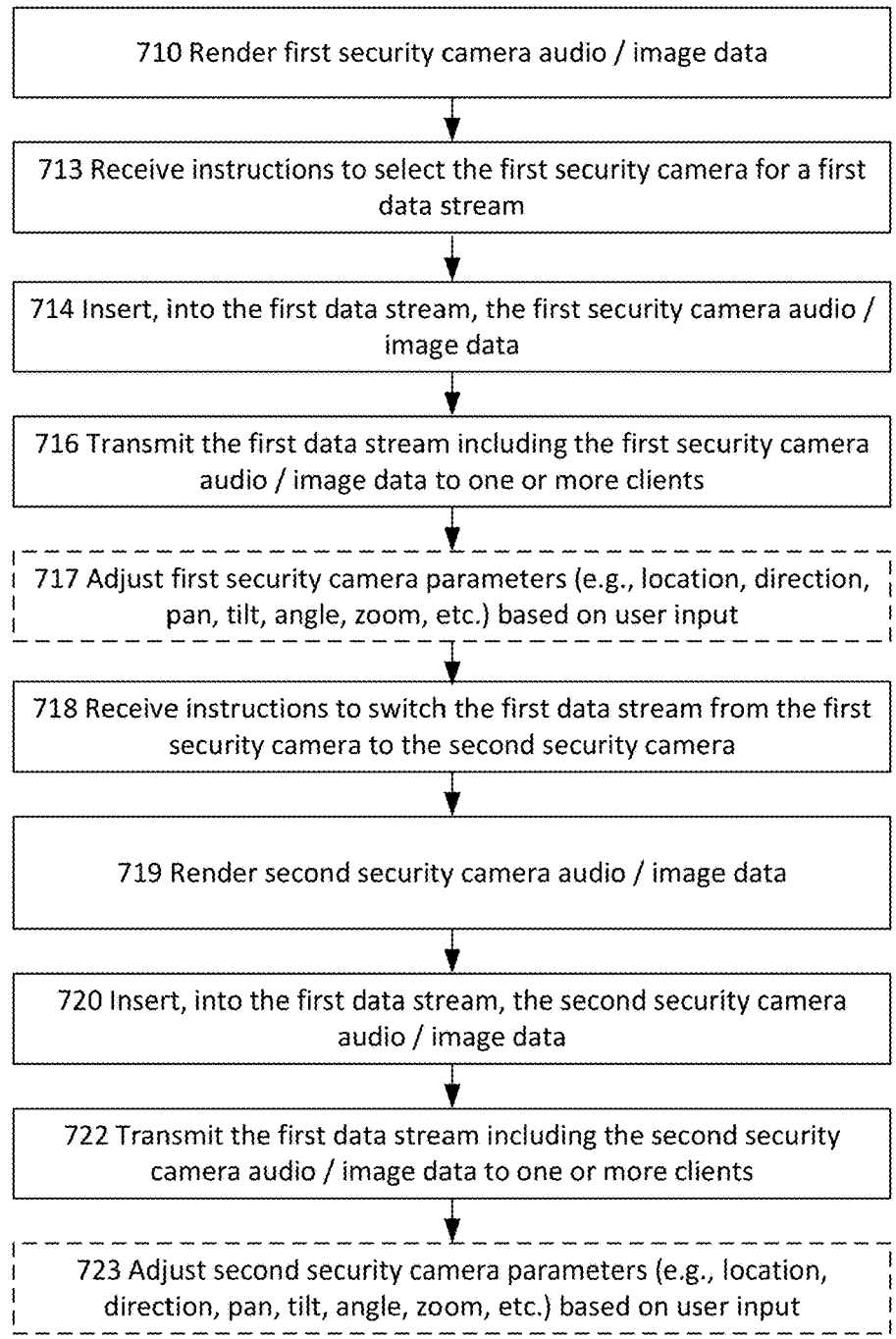
FIG. 7 is a flowchart illustrating an example process for client controlled streaming of multiple server-rendered security camera views that may be used in accordance with the present disclosure.

FIG. 7 is a flowchart illustrating an example process for client controlled streaming of multiple server-rendered security camera views that may be used in accordance with the present disclosure. In particular, at operation 710 first security camera audio and/or image data for a first security camera are rendered. Some example techniques for rendering of security camera audio and/or image data are described in detail above and are not repeated here.

At operation 713, instructions are received to select the first security camera for a first data stream that is transmitted to one or more clients using streaming content delivery techniques. As set forth above, the instructions may be provided from one or more clients, for example using stream control components 314 of FIG. 3 and/or content item clients 111A-C of FIGS. 1-2. As also set forth above, the instructions may be received by, for example, security camera selection components 171 of FIGS. 2-3. At operation 714, the first security camera audio and/or image data are inserted into the first data stream by, for example, security camera selection components 171. At operation 716, the first data stream including the first security camera audio and/or image data is transmitted to one or more clients using streaming content delivery techniques. At operation 717, which is an optional step (as indicated by the dashed outline of operation 717 in FIG. 7), security camera parameters (e.g., location, direction, pan, tilt, angle, zoom, etc.) associated with the first security camera may be adjusted based on instructions from one or more clients. For example, parameter adjustment instructions may be received from stream control components 314 of FIG. 3 and/or content item clients 111A-C of FIGS. 1-2 and/or received using chat functionality. Some example techniques for adjusting of security camera parameters are described in detail above and are not repeated here.

At operation 718, instructions are received to switch the first data stream from the first security camera to second security camera. As set forth above, the instructions may be provided from one or more clients, for example using stream control components 314 of FIG. 3 and/or content item clients 111A-C of FIGS. 1-2. As also set forth above, the instructions may be received by, for example, security camera selection components 171 of FIGS. 2-3. In some examples, the instructions to switch the first data stream from the first security camera to second security camera may be received from a broadcaster that controls presentation of the first data stream to one or more spectators. Also, in some examples, the instructions to switch the first data stream from the first security camera to second security camera may be received from one or more spectators that are temporarily assigned permission to control the first data stream.

At operation 719, second security camera audio and/or image data for a second security camera are rendered. In some examples, rendering of the second security camera audio and/or image data may be initiated in response to the camera switching operations received at operation 718. By contrast, in some examples, rendering of the second security camera audio and/or image data may be initiated at an earlier time. For example, some techniques for recording and storing rendered camera audio and/or image data for subsequent transmission are described in detail below with respect to FIG. 8.

At operation 720, in response to operation 718, the second security camera audio and/or image data are inserted into the first data stream by, for example, security camera selection components 171. Also, in some examples, at operation 720, the first security camera audio and/or image data may cease to be inserted into the first data stream. In other example, the first security camera audio and/or image data may continue to be included in the first data stream, but may have a reduced priority relative to the second security camera audio and/or image data, such as a reduced size, reduced image and/or audio quality, reduced volume, and the like. At operation 722, in response to operation 718, the first data stream including the second security camera audio and/or image data is transmitted to one or more clients using streaming content delivery techniques. At operation 723, which is an optional step (as indicated by the dashed outline of operation 723 in FIG. 7), security camera parameters (e.g., location, direction, pan, tilt, angle, zoom, etc.) associated with the second security camera may be adjusted based on instructions from one or more clients. For example, parameter adjustment instructions may be received from stream control components 314 of FIG. 3 and/or content item clients 111A-C of FIGS. 1-2 and/or received using chat functionality.

It is noted that the switching of security cameras for a transmitted data stream described with respect to FIG. 7 is merely one example security camera control technique and many other options for controlling of security cameras may be made available to users. For example, as set forth above, the first data stream may be switched back to the first security camera such that the second security camera merely temporarily interrupts the first security camera audio and/or image data. In other examples, the first data stream may be set to periodically alternate (or cycle) switching between the first security camera, the second security camera, and possibly other security cameras. In yet other examples, audio and/or image data from the first and the second security cameras may be combined into the first data stream. Many other examples for user control of security cameras are described in detail above and are not repeated here.

It is further noted that, while the above-described techniques are explained in the context of security cameras, the above-described techniques are not limited to security cameras and may, in some examples, be applied to any server-rendered virtual camera view of a virtual area. Thus, in some examples, any or all operations, components, or other disclosed features that describe or refer to security cameras may be considered to also describe, include, and apply to any server-rendered view, regardless of whether the view is or is not considered a to be a security camera view.

In some examples, server-rendered (e.g., security camera) view data may be captured, recorded, and stored for later use. For example, in some cases, rendered image and/or audio data for the server-rendered view may be captured, recorded, and stored. This may provide a number of advantages. For example, in some cases, players or other authorized users may not be available to view security camera data at the time that it is rendered. Thus, in some cases, a user may request the recorded rendered data at a later time when the user becomes available, and the recorded rendered data may be streamed to the user at the later time.

It is noted, however, that storage of rendered image and other data may sometimes require large amounts of storage capacity that may be expensive or, in some cases, may be unavailable. To alleviate these and other concerns, security camera view data or other server-rendered view data, such as object position data and other relevant state data, may sometimes be captured, recorded, and stored. This stored server-rendered view data may then be used to render image and other data, upon request, at a later time. Recording and storage of this pre-rendered view data prior to its rendering may, in some cases, substantially reduce the amount of required storage capacity as opposed to, for example, storage of rendered image data after its rendering. In some cases, if rendering of respective image data is not requested within a specified time period of capturing of the view data, then the view data may be erased without ever using it to actually render the respective image data.

Additionally, in some examples, captured view data may be used to render a view in association with a different or subsequent instance of a content item. For example, consider the scenario in which a first player participates in a first instance of a car racing video game. In the first instance of the game, the first player may be racing a first car on an empty race track. In some examples, position data or other data associated with the first player's movement and control of the first car, such as the first car's position and movement over time, may be captured, recorded, and stored. This stored position data from the first instance of the game may then be requested by a second instance of the game, in which the first player will be racing the first car against a second car controlled by a second player. In some cases, the position data captured and recorded during the first instance of the game may be used to reproduce the position and movements of the first car in the second instance of the game. This may allow the first car to be raced in the second instance of the video game, even though the first player is not required to log-on or otherwise actively participate in the second instance of the game. In some examples, the first player may be notified that his recorded position data is being used in the second instance of the game, and image and other data associated with the second instance of the game may be streamed to the first player and/or other authorized users. However, as set forth above, participation from the first player in the second instance of the game is not required, and the first player may, in some examples, not participate in the first instance of the game. Moreover, participation from the second player in the first instance of the game is not required, and the second player may, in some examples, not participate in the first instance of the game.

Figure 8:
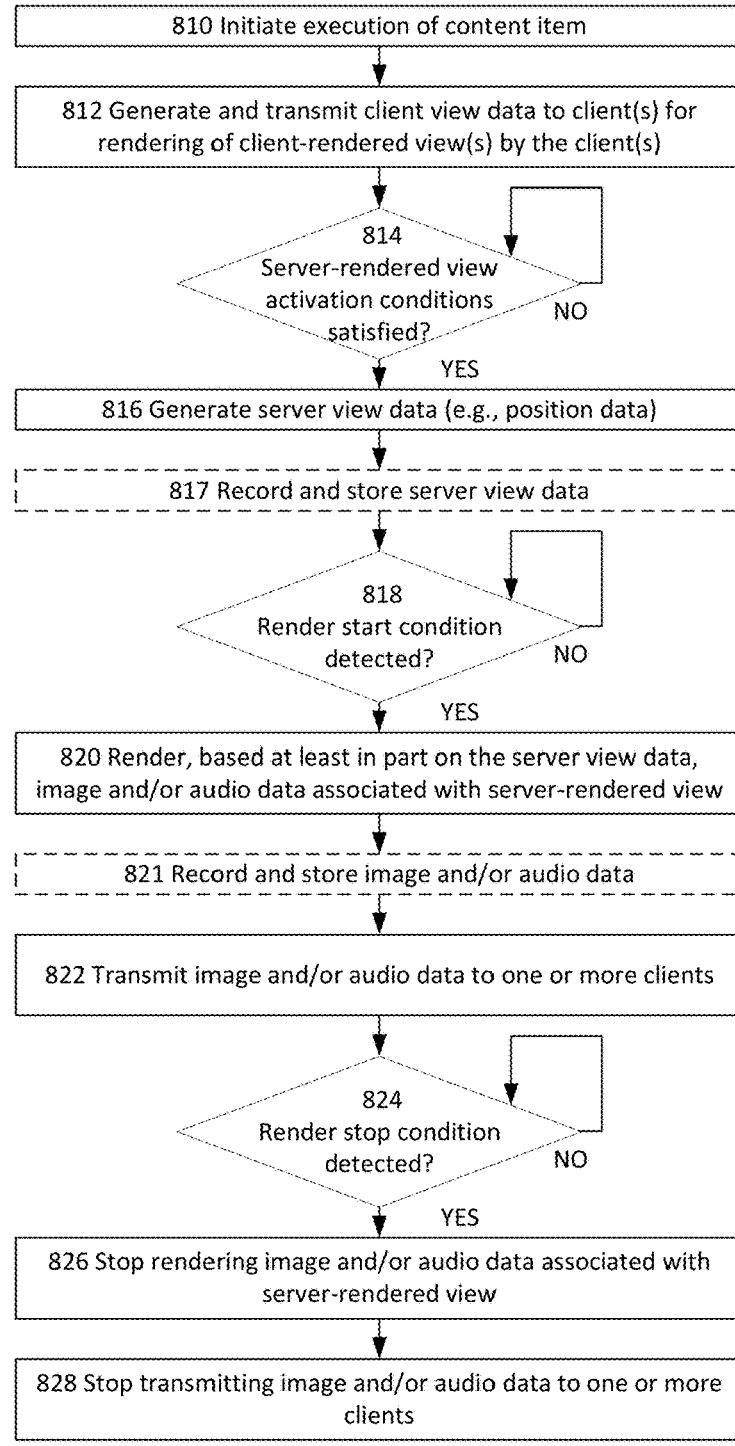
FIG. 8 is a flowchart illustrating an example process for server view rendering and transmission that may be used in accordance with the present disclosure.

FIG. 8 is a flowchart illustrating an example process for server view rendering and transmission that may be used in accordance with the present disclosure. The process begins at operation 810, at which execution of a content item is initiated. At operation 812, client view data is generated and transmitted to one or more client devices for rendering of one or more client-rendered views by the one or more client devices. The generation and transmission of client view data is described in detail above and is not repeated here.

At operation 814, it is determined whether one or more conditions are satisfied for activating a server-rendered (e.g., security camera) view. As set forth above, the security camera activation conditions may be satisfied when, for example, a participant logs off from the content item, at certain times of day, or when other conditions are met, such as when an opponent character moves within a proximity of the security camera. Some more specific examples of security camera activation conditions are described in detail above and are not repeated here.

At operation 816, server view data is generated. As set forth above, the server view data includes data that may be used to render image and/or audio data associated with the server-rendered view. The server view data may include, for example, position and other information about one or more objects within or adjacent to the server-rendered view and other content item information.

In some examples, the server view data may be recorded and stored at operation 817. As set forth above, recording and storage of the server view data may allow for a delay, and in some cases a substantial delay, between the time that the server view data is generated and the time that respective server-rendered view image and/or audio data is rendered. As set forth above, this may sometimes be advantageous because, for example, the server view data may require less storage capacity than the image and/or audio data that is rendered based on the server view data.

At operation 818, it is determined whether a render start condition is detected. The render start condition triggers rendering of the server-rendered view image and/or audio data. In some examples, the render start condition may be detected after initiation of rendering of the one or more client-rendered views by the one or more connected client devices. The render start condition may include, for example, receiving a client request for the image data associated with the server-rendered view, establishment of a connection with a client device, logging off of the first participant from the content item, movement of a character or object into, out of, or within the server-rendered view, or a state change of a character or object associated with the server-rendered view, and an initiation of an additional instance of the content item.

In some examples, the activation condition satisfied at operation 814 and the render start condition detected at operation 818 may be one in the same. As should be appreciated, this may result in starting of rendering of the server rendered view at the same time (or near the same time) as the server view data is generated. In these cases, it may often not be necessary to record and store the server view data.

By contrast, in some cases, the render start condition may be different from the view activation condition and may not be detected until well after the satisfaction of the view activation condition. In these cases, it may often be necessary to record and store the server view data.

For example, in some cases, the view activation condition may be satisfied at operation 814 when a player logs off from a video game. At that time, generation of the server view data may begin and the server view data may be recorded and stored. In some cases, however, the render start condition may be detected at operation 818 when the player connects to the server via a web browser several hours after logging off from the game. In this example, the server view data may be recorded and stored and then used to render image and/or audio data at the later time when the player connects to the server via the web browser.

As another example, the view activation condition may be satisfied at operation 814 when a first player initiates a first instance of a video game, such as a car racing game in which the first player races a first car on an empty track. Server view data, including position data for the first car as it is raced on the track, may then be recorded and stored. Additionally, the render start condition may be triggered by initiation of a second instance of the game that is initiated after completion of the first instance of the game. In the second instance of the game, the recorded and stored server view data from the first instance of the game may be used to allow the first car to race against a second car operated by a second player. In particular, the recorded and stored server view data from the first instance of the game may be combined with position data and other data from the second instance of the game to render image data associated with the second instance of the game, such as image data of the first car racing against the second car. As should be appreciated, other examples in which view data from a first instance of the game is used in a second instance of the game are also contemplated for use with the disclosed techniques.

At operation 820, in response to detection of the render start condition, image and/or audio data associated with the server-rendered view is rendered, based at least in part, on the server view data generated at operation 816. The rendering at operation 820 is performed by one or more servers. Various techniques for server rendering of image and/or audio data are described in detail above and are not repeated here. In some examples, at operation 821, the image and/or audio data rendered at operation 820 may be recorded and stored prior to being transmitted to one or more clients. At operation 822, the rendered image and/or audio data are transmitted to one or more clients using, for example, streaming content delivery techniques. As set forth above, various additional data, such as metadata, associated with the server-rendered view may also be transmitted from the server to one or more clients along with the rendered image and/or audio data.

At operation 824, it is determined whether a render stop condition is detected. The render stop condition triggers stopping of rendering of the server-rendered view image and/or audio data. The render stop condition may include, for example, receiving a client request to stop transmission of the image data associated with the server-rendered view, experiencing a disconnection from a client device, logging on of the first participant to the content item, movement of a character or object into, out of, or within the server-rendered view, or a state change of a character or object associated with the server-rendered view, and a termination of an additional instance of the content item. At operation 826, in response to detection of the render stop condition, rendering of image and/or audio data associated with the server-rendered view is stopped. At operation 828, transmission of the rendered image and/or audio data is also sopped.

It is noted that client devices that may be used to play a video game or otherwise participate in a content item and/or receive and present security camera or other server-rendered view data may include any types of computing devices, such as desktop or laptop computers, gaming consoles, tablets, smart phones, other mobile phones and devices, and others. In one specific example, a player may play a video game using a traditional desktop or laptop computer or gaming console. The player may then disconnect or otherwise log-off from the game. The disconnection of the player from the game may then, in some cases, trigger rendering of a server-rendered security camera view of the game. The player may then access the server-rendered security camera view from a different type of device, such as a smart phone.

Also, in some examples, one or more notifications may be sent to a client device, such as a smart phone, to provide information to a user regarding a security camera or other server-rendered view. For example, in some cases, when it is detected that security camera view activation conditions have become satisfied (e.g., as detected at operation 814 of FIG. 8), a text, email, phone call, and/or other type of notification may be sent to a smart phone or other client device to inform the user that the security camera view has become activated and/or is otherwise available for viewing. In some examples, the user may then access the security camera view on the smart phone or other client device, for example using a web browser or other information presentation program. Furthermore, in some examples, notifications may be sent regarding other information associated with a security camera view, such as a notification of when certain characters and/or assets are moved within or outside of the security camera's field of view, a notification of detection of a render start condition (e.g., as detected at operation 818 of FIG. 8), or upon occurrences of other actions or conditions.

It is noted that, in some examples, the quality and/or other characteristics of image, audio, and/or other data associated with a server-rendered view may vary depending upon various circumstances. For example, in some cases, when rendered image data is recorded and stored by one or more servers prior to being transmitted, the rendered image data may sometimes include lower quality image data, for example in comparison to other image data that is transmitted by the one or more servers without first being recorded and stored by the one or more servers. The lower quality image data may include, for example, data with lower resolution, lesser object detail, or image data in which non-important portions of images (e.g., background) may be omitted. Storage of this lower quality image or other data may sometimes be advantageous by, for example, reducing required storage capacity, thereby potentially lowering expenses and allowing data covering larger periods of time to be stored. Additionally, it is noted that the quality of transmitted image, audio, and other data (e.g., encoding bitrates, amounts of error correction, object detail, etc.) may also sometimes be adjusted based on, for example, available network bandwidth and other associated transmission conditions.

Figure 9:
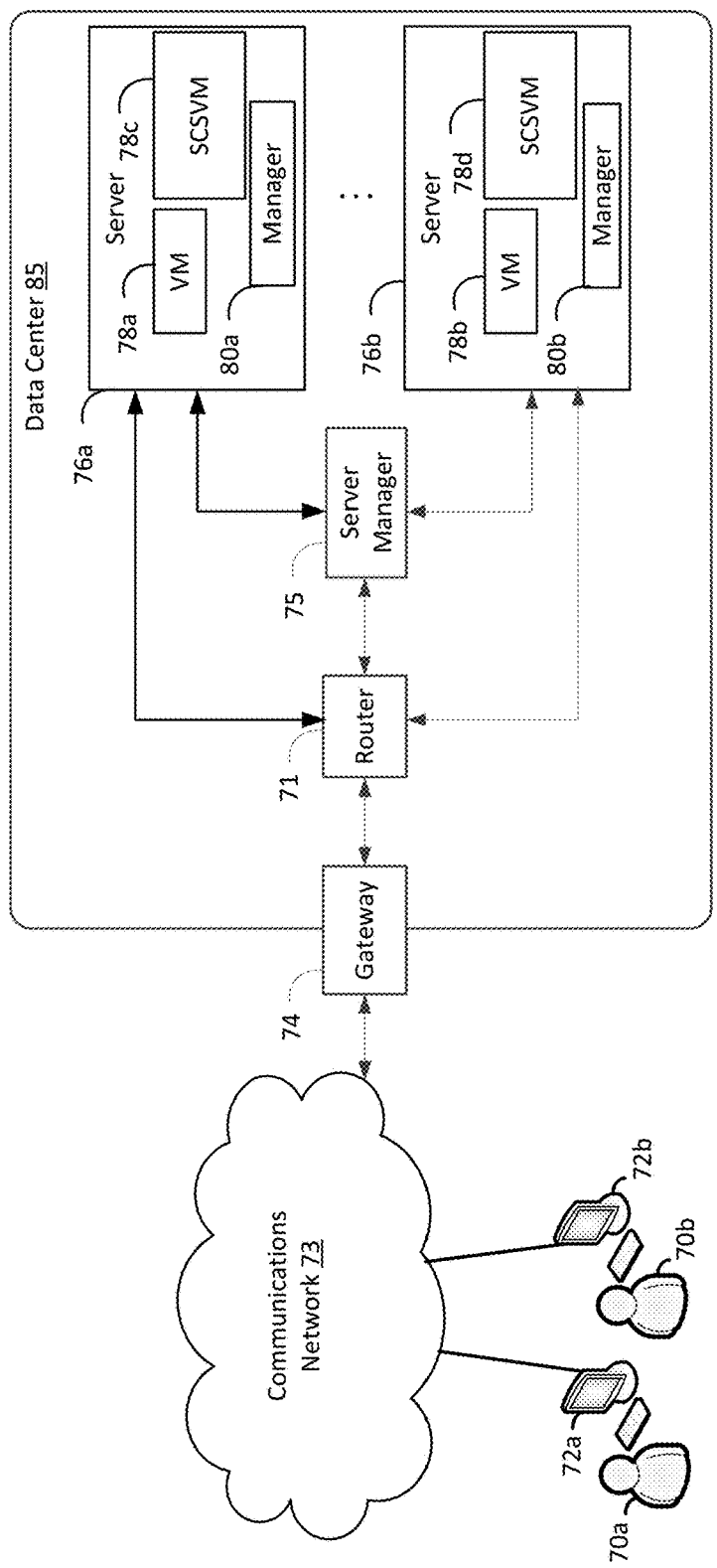
FIG. 9 is a diagram illustrating an example system for transmitting and providing data that may be used in accordance with the present disclosure.

An example system for transmitting and providing data, such as security camera audio and/or image, will now be described in detail. In particular, FIG. 9 illustrates an example computing environment in which the embodiments described herein may be implemented. FIG. 9 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are security camera streaming virtual machine ("SCSVM") instances. The SCSVM virtual machine instances 78c and 78d may be configured to perform all, or any portion, of the techniques for security camera data rendering and streaming and/or any other of the disclosed techniques in accordance with the present disclosure and described in detail above. As should be appreciated, while the particular example illustrated in FIG. 9 includes one SCSVM virtual machine in each server, this is merely an example. A server may include more than one SCSVM virtual machine or may not include any SCSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 9, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 9 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 9, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 9, a server manager 75 is also employed to at least in part direct various communications to, from and/or between servers 76a and 76b. While FIG. 9 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors.

Server manager 75 may, for example, collect or otherwise have access to state information and other information associated with various tasks in order to, for example, assist in managing communications and other operations associated with such tasks.

It should be appreciated that the network topology illustrated in FIG. 9 has been greatly simplified and that many more networks and networking devices may be utilized to interconnect the various computing systems disclosed herein. These network topologies and devices should be apparent to those skilled in the art.

It should also be appreciated that data center 85 described in FIG. 9 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 10:
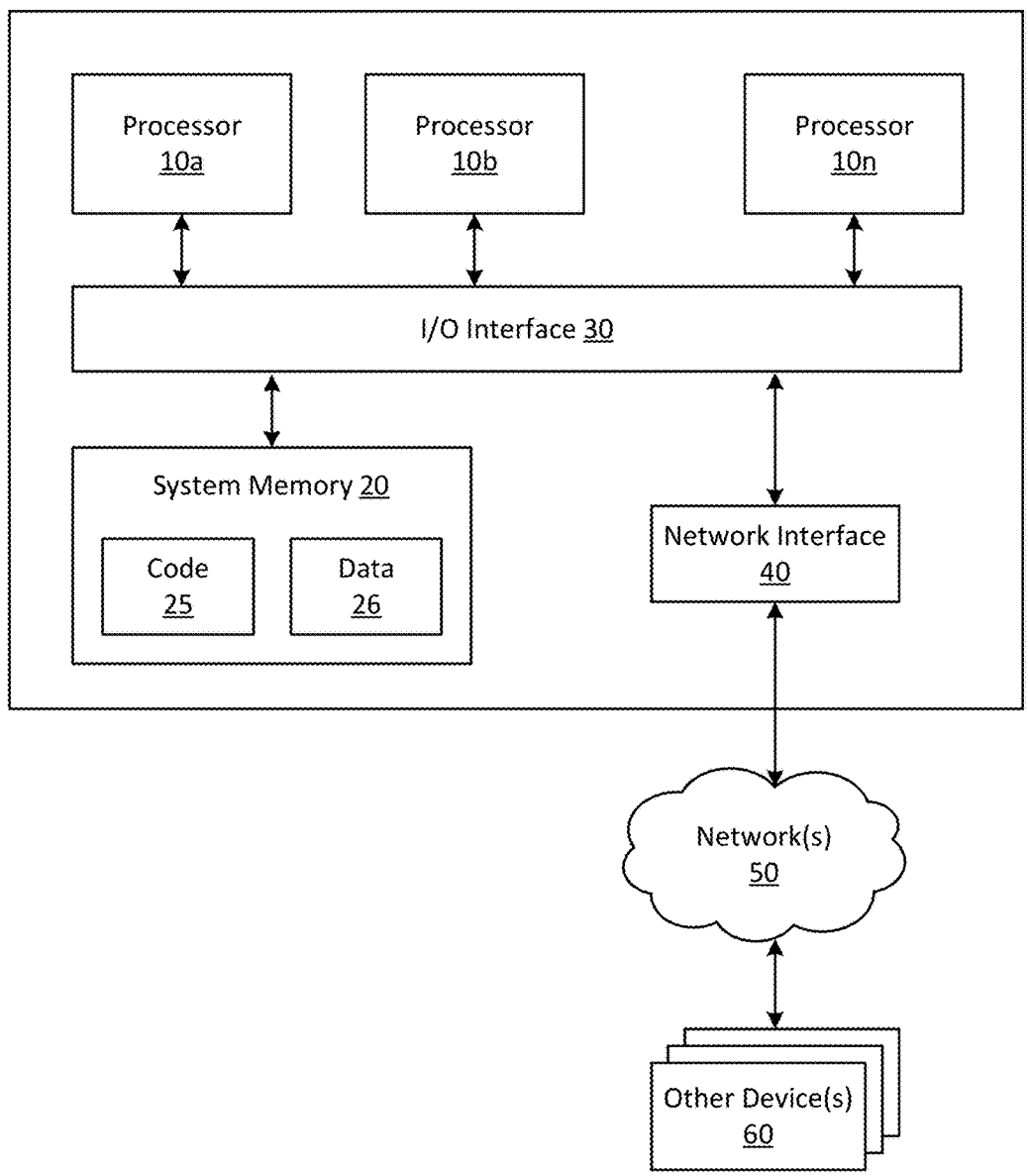
FIG. 10 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 10 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for view rendering and transmission comprising:
   one or more processors; and
   one or more memories having stored therein instructions that, upon execution by the one or more processors, cause the computing system perform operations comprising:
   initiating execution of a content item;
   generating first view data for rendering of a first view of a virtual area, the first view associated with a first participant of the content item;
   generating security camera view data for rendering of a security camera view of the virtual area, the security camera view associated with the first participant of the content item;
   detecting, subsequent to initiation of rendering of the first view, a condition that triggers rendering of the security camera view;
   rendering, on one or more servers, based at least in part on the security camera view data, image data associated with the security camera view; and
   streaming, over one or more networks, the image data to one or more clients.

2. The computing system of claim 1, wherein the operations further comprise, prior to the detecting of the condition, recording and storing the security camera view data.

3. The computing system of claim 1, wherein the condition that triggers rendering of the security camera view comprises at least one of receiving a client request for the image data associated with the security camera view, establishment of a connection with a client device, logging off of the first participant from the content item, movement of a character or object into, out of, or within the security camera view, a state change of a character or object associated with the security camera view, or an initiation of an additional instance of the content item.

4. The computing system of claim 1, wherein the security camera view data comprises position data indicating positions of objects within the security camera view.

5. A method for view rendering and transmission comprising
   initiating execution of a content item;
   generating first view data for rendering of a first view of a virtual area, the first view associated with a first participant of the content item;
   generating second view data for rendering of a second view of the virtual area, the second view associated with the first participant of the content item;
   detecting, subsequent to initiation of rendering of the first view, a condition that triggers rendering of the second view;
   rendering, on one or more servers, based at least in part on the second view data, image data associated with the second view; and
   streaming, over one or more networks, the image data to one or more clients.

6. The method of claim 5, further comprising, prior to the detecting of the condition, recording and storing the second view data.

7. The method of claim 5, further comprising, prior to initiation of the streaming, recording and storing the image data associated with the second view.

8. The method of claim 5, wherein the image data associated with the second view is recorded, stored, and transmitted by the one or more servers, and wherein the image data associated with the second view includes lower quality image data than other image data that is transmitted by the one or more servers without being recorded and stored by the one or more servers.

9. The method of claim 5, wherein the condition that triggers rendering of the second view comprises at least one of receiving a client request for the image data associated with the second view, establishment of a connection with a client device, logging off of the first participant from the content item, movement of a character or object into, out of, or within the second view, a state change of a character or object associated with the second view, or an initiation of an additional instance of the content item.

10. The method of claim 5, wherein the second view data is generated in a first instance of the content item, and wherein the rendering of the second view occurs in association with a second instance of the content item.

11. The method of claim 10, wherein the second instance of the content item includes one or more participants that are not included in the first instance of the content item.

12. The method of claim 5, wherein the second view data comprises position data indicating positions of objects within the second view.

13. The method of claim 5, further comprising:
    detecting a condition that triggers stopping of rendering of the second view;
    stopping the rendering of the image data associated with the second view; and
    stopping the streaming of the image data to the one or more clients.

14. One or more non-transitory computer-readable storage media having stored thereon instructions that, upon execution by one or more compute nodes, cause the one or more compute nodes to perform operations comprising:
    initiating execution of a content item;
    generating first view data for rendering of a first view of a virtual area, the first view associated with a first participant of the content item;
    generating second view data for rendering of a second view of the virtual area, the second view associated with the first participant of the content item;
    detecting, subsequent to initiation of rendering of the first view, a condition that triggers rendering of the second view;
    rendering, on one or more servers, based at least in part on the second view data, image data associated with the second view; and
    streaming, over one or more networks, the image data to one or more clients.

15. The one or more non-transitory computer-readable storage media of claim 14, wherein the operations further comprise, prior to the detecting of the condition, recording and storing the second view data.

16. The one or more non-transitory computer-readable storage media of claim 14, wherein the operations further comprise:
    detecting a condition that triggers stopping of rendering of the second view;
    stopping the rendering of the image data associated with the second view; and
    stopping the streaming of the image data to the one or more clients.

17. The one or more non-transitory computer-readable storage media of claim 14, wherein the image data associated with the second view is recorded, stored, and transmitted by the one or more servers, and wherein the image data associated with the second view includes lower quality image data than other image data that is transmitted by the one or more servers without being recorded and stored by the one or more servers.

18. The one or more non-transitory computer-readable storage media of claim 14, wherein the condition that triggers rendering of the second view comprises at least one of receiving a client request for the image data associated with the second view, establishment of a connection with a client device, logging off of the first participant from the content item, movement of a character or object into, out of, or within the second view, a state change of a character or object associated with the second view, or an initiation of an additional instance of the content item.

19. The one or more non-transitory computer-readable storage media of claim 14, wherein the second view data is generated in a first instance of the content item, and wherein the rendering of the second view occurs in association with a second instance of the content item.

20. The one or more non-transitory computer-readable storage media of claim 14, wherein the second view data comprises position data indicating positions of objects within the second view.

* * * * *